United States Patent [19]

Maeno et al.

[11] Patent Number: 5,914,926
[45] Date of Patent: Jun. 22, 1999

[54] OPTICAL RECORDING MEDIUM FOR CHECKING COMPATIBILITY OF AN OPTICAL PICKUP DEVICE AND METHOD OF CHECKING AN OPTICAL PICKUP DEVICE USING THE SAME

[75] Inventors: Yoshiaki Maeno; Yasuhiro Kodama; Hitoshi Terasaki, all of Gifu, Japan

[73] Assignee: Sanyo Electric Co., Ltd., Osaka, Japan

[21] Appl. No.: 08/847,720

[22] Filed: Apr. 22, 1997

[30]      Foreign Application Priority Data

Jun. 18, 1996  [JP]  Japan .................................. 8-156885
Dec. 26, 1996  [JP]  Japan .................................. 8-348680

[51] Int. Cl.$^6$ ...................................................... G11B 7/00
[52] U.S. Cl. ........................................... 369/54; 94/275.4
[58] Field of Search .......................... 369/94, 110, 275.1, 369/275.2, 280, 281, 286, 283, 284, 288, 54, 58, 275.3, 275.4

[56]             References Cited

U.S. PATENT DOCUMENTS 5,696,754  12/1997  Nishizawa ........................... 369/275.1
5,726,969  3/1998   Moriya et al. ....................... 369/275.1
5,764,619  6/1998   Nishiuchi et al. ....................... 369/94

FOREIGN PATENT DOCUMENTS

| 0 368 442 A2 | 5/1990  | European Pat. Off. . |
| 0 475 529 A1 | 3/1992  | European Pat. Off. . |
| 0 520 619 A1 | 12/1992 | European Pat. Off. . |
| 5-303766     | 11/1993 | Japan . |
| 6-187662     | 7/1994  | Japan . |
| WO96 19807   | 6/1996  | WIPO . |

*Primary Examiner*—Thang V. Tran
*Attorney, Agent, or Firm*—Armstrong, Westerman, Hattori, McLeland & Naughton

[57]             ABSTRACT

Two or three different signal recording regions are formed in one optical disk. One signal recording region is positioned at a depth of 0.6 mm from a disk surface and is formatted in accordance with a single layer or two layer DVD standard, for example. Remaining signal recording region is positioned at a depth of 1.2 mm from the disk surface and is formatted in accordance with the CD, CD-R or MO disk standard, for example. By using such an optical disk, whether a manufactured optical pickup device is capable of reproducing two or three different types of optical disks can be checked quickly.

14 Claims, 17 Drawing Sheets

54

OPTICAL RECORDING MEDIUM FOR CHECKING COMPATIBILITY OF AN OPTICAL PICKUP DEVICE AND METHOD OF CHECKING AN OPTICAL PICKUP DEVICE USING THE SAME

BACKGROUND OF THE INVENTION

1. Field of the Invention

The present invention relates to an optical recording medium for checking compatibility of an optical pickup device and to a method of checking an optical pickup device using the same. More particularly, the present invention relates to an optical disk for checking whether an optical pickup device is capable of reproducing signals of a plurality of optical disks of different standards, and to a method of checking.

2. Description of the Background Art

An optical disk having the thickness of about 1.2 mm from which signals are read by using a semiconductor laser, such as a CD-ROM (Compact Disk-Read Only Memory) has been proposed. In order to read a signal from this type of optical disk, an objective lens for pickup is controlled in accordance with focus and tracking servo while pit string on a signal recording surface is irradiated with a laser beam.

Recently, density has been made higher to record motion picture for a long period of time. For example, a DVD (Digital Video Disk) standard has been proposed for recording about 5G byte of signals on one surface of an optical disk having the diameter of 12 cm which is the same as an ordinary CD-ROM. The substrate for the DVD is about 0.6 mm in thickness, and by adhering two such disks as one and the other surfaces, it is possible to record about 10G byte of signals in one DVD.

Accordingly, in the future, there will be optical disks having thin substrate of 0.6 mm in thickness and optical disks having standard substrate of 1.2 mm in thickness existing together.

Japanese Patent Laying-Open No. 5-303766 discloses an optical pickup device which is capable of reproducing both the high density optical disk having the thin substrate of 0.6 mm in thickness and the standard density optical disk having the standard substrate of 1.2 mm in thickness.

In the situation where optical disks having the thicknesses of 0.6 mm and 1.2 mm exist together, it is most important that an optical pickup device is capable of reproducing a CD (Compact Disk), a CD-R (Compact Disk-Recordable), a DVD and an MO (Magneto-Optical) disk. Accordingly, an optical pickup device has been developed which is compatible in reproducing 1) CD and DVD, 2) CD-R and DVD, 3) MO disk and DVD, 4) CD, CD-R and DVD, and 5) CD, MO disk and DVD. Therefore, in manufacturing such pickup devices, it is necessary to quickly check whether the optical pickup device has desired compatibility.

SUMMARY OF THE INVENTION

Therefore, the object of the present invention is to provide an optical recording medium for enabling quick checking of compatibility of an optical pickup device.

Another object of the present invention is to provide a method of checking compatibility of an optical pickup device using the optical recording medium.

According to an aspect of the present invention, the optical recording medium includes a transparent substrate, a first signal recording region, a first reflection film, a second signal recording region and a second reflection film. The transparent substrate has a main surface. The first signal recording region is formed substantially parallel to the main surface in the transparent substrate, and is formatted in accordance with a first standard. The first reflection film is formed on the opposite side of the main surface of the transparent substrate on the first signal recording region. The second recording region is formed in the transparent substrate substantially parallel to the main surface of the substrate, and is formatted in accordance with a second standard. The second reflection film is formed on the opposite side of the main surface of the transparent substrate on the second signal recording region.

Preferably, distance between the first signal recording region and the main surface of the transparent substrate is shorter than distance between the second signal recording region and the main surface of the transparent substrate.

More preferably, the first signal recording region is formed partially in the transparent substrate. The second signal recording region is formed entirely in the transparent substrate.

Preferably, the transparent substrate is formed of glass.

According to another aspect of the present invention, the optical recording medium includes a first transparent substrate, a first signal recording region, a first reflection film, a second transparent substrate, a second signal recording region and a second reflection film. The first signal recording region is formed on the first transparent substrate and is formatted in accordance with a first standard. The first reflection film is formed on the first signal recording region. The second transparent substrate is formed on the first transparent film. The second signal recording region is formed on the second transparent region.

According to a still another object of the present invention, the method of checking an aforementioned optical recording medium includes the steps of irradiating a first signal recording region with a laser beam from an optical pickup device, to determine if the optical pickup device is capable of reproducing a signal from the first signal recording region; after the step of determination, moving the optical pickup device from the first recording region to the second recording region; after the step of moving, irradiating the second signal recording region with a laser beam from the optical pickup device to determine whether or not the optical pickup device is capable of reproducing a signal from the second signal recording region.

An advantage of the present invention is that compatibility of the optical pickup device can be checked quickly as one optical recording medium has a plurality of signal recording regions which are formatted in accordance with mutually different standards.

Another advantage of the present invention is that the optical recording medium has high durability against frequent use for checking, as the transparent substrate is formed of glass.

A still further advantage of the present invention is that adjustment of the optical pickup device can be performed with high precision since there is hardly a warp or surface vibration.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
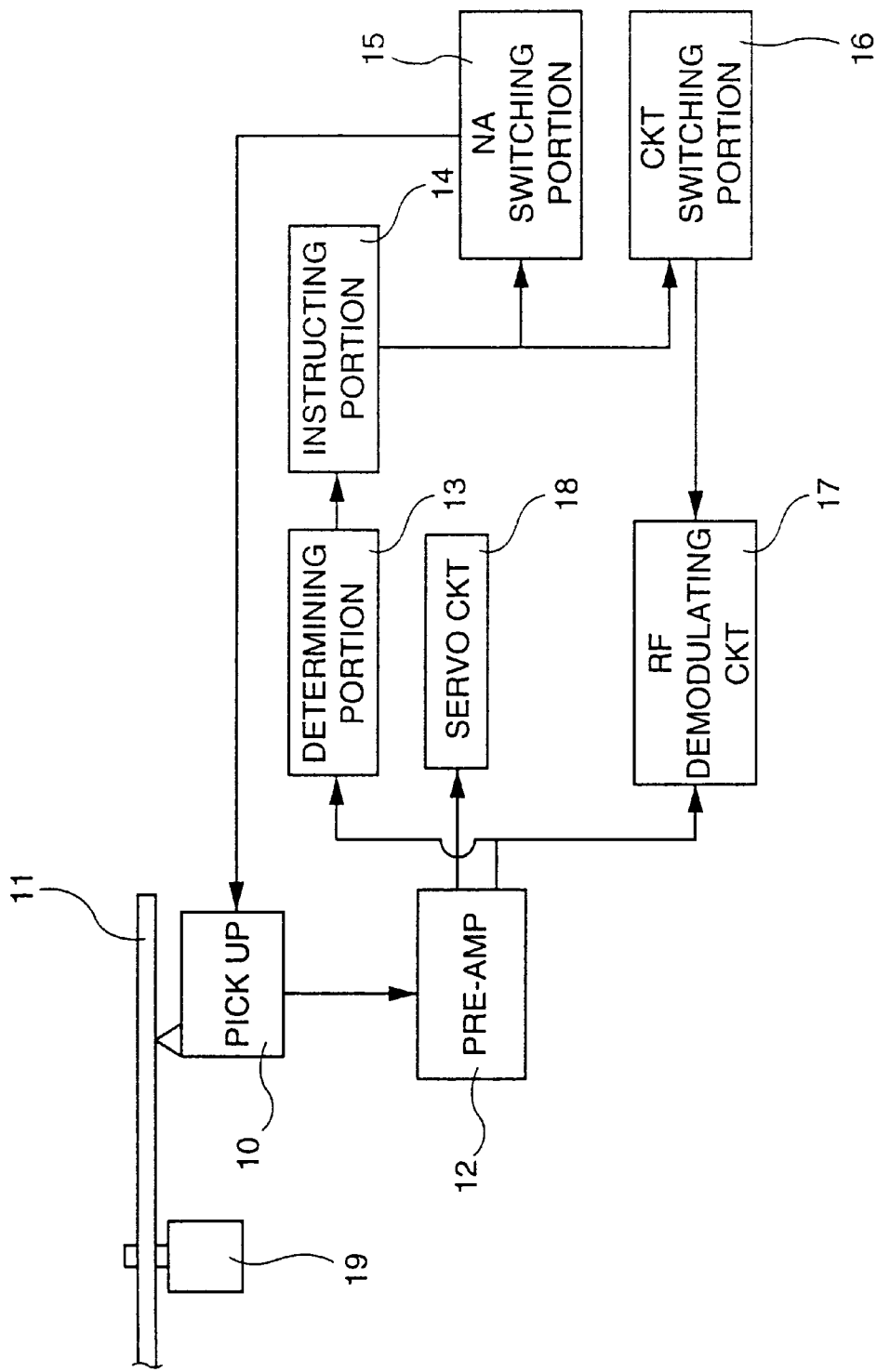
FIG. 1 is a block diagram showing an overall structure of an optical disk reproducing apparatus including a DVD/CD compatible optical pickup device.

In the following, embodiments of the present invention will be described in detail with reference to the figures. In the figures, same or corresponding portions are denoted by the same reference characters and description thereof is not repeated.

First Embodiment

Table 1 below shows standards and conditions for reproduction of a DVD (Digital Video Disk) and a CD-DA (Compact Disk-Digital Audio; hereinafter simply referred to as "CD").

TABLE 1

| Type | | DVD | CD |
|---|---|---|---|
| Standard | Substrate Thickness | 0.6 mm (0.55–0.65 mm) | 1.2 mm (1.1–1.3 mm) |
| | Shortest Pit Length | 0.40 μm (0.3–0.5 μm) | 0.90 μm (0.80–1.0 μm) |
| | Track Pitch | 0.74 μm (0.73–0.75 μm) | 1.6 μm (1.5–1.7 μm) |
| | Reflectance | at least 70% | 20–40% at least 70% |
| Condition for Reproduction | Spot Diameter | 0.9 μm (0.85–0.95 μm) | 1.5 μm (1.4–1.6 μm) |
| | Numerical Aperture | 0.60 (0.55–0.65) | 0.42 (0.30–0.55) |
| | Wavelength | 635 nm (620–650 nm) | |

As is apparent from the table, according to DVD standard, substrate thickness is 0.6 (tolerance ±0.05) mm, shortest pitch length is 0.40 (tolerance ±0.1) μm, and track pitch is 0.74 (tolerance ±0.01) μm. On the other hand, according to CD standard, substrate thickness is 1.2 (tolerance ±0.1) mm, shortest pitch length is 0.9 (tolerance ±0.1) μm and track pitch is 1.6 (tolerance ±0.1) μm.

First, an optical disk reproducing apparatus including an optical pickup device capable of DVD and CD compatible reproduction will be described. Referring to FIG. 1, a reproduction signal detected from an optical disk 11 by means of an optical pickup device 10 is applied to a preamplifier 12. From preamplifier 12 to a determining portion 13, signals necessary for determining the optical disk such as a focus error signal are applied, and at determining portion 13, optical disk 11 mounted on the reproducing apparatus is determined. The result of determination by determining portion 13 is applied to an instructing portion 14. Instructing portion 14 controls an NA switching portion 15 such that effective numerical aperture (NA) of an objective lens in optical pickup device 10 is switched in accordance with the result of determination from determining portion 13. NA switching portion 15 switches the effective numerical aperture of the objective lens in accordance with an instruction from instructing portion 13. The method of switching effective numerical aperture will be described later.

Instructing portion 14 also controls a circuit switching portion 16 in accordance with the result of determination from determining portion 13. Circuit switching portion 16 switches an RF demodulating circuit 17 so that it is suitable for reproducing the mounted optical disk 11. The reproduction signal from preamplifier 21 is demodulated by RF demodulating circuit 17. The reproduction signal from preamplifier 12 is also applied to a servo circuit 18, and the servo circuit 18 controls a spindle motor 19 and so on for rotating optical disk 11.

Figure 2:
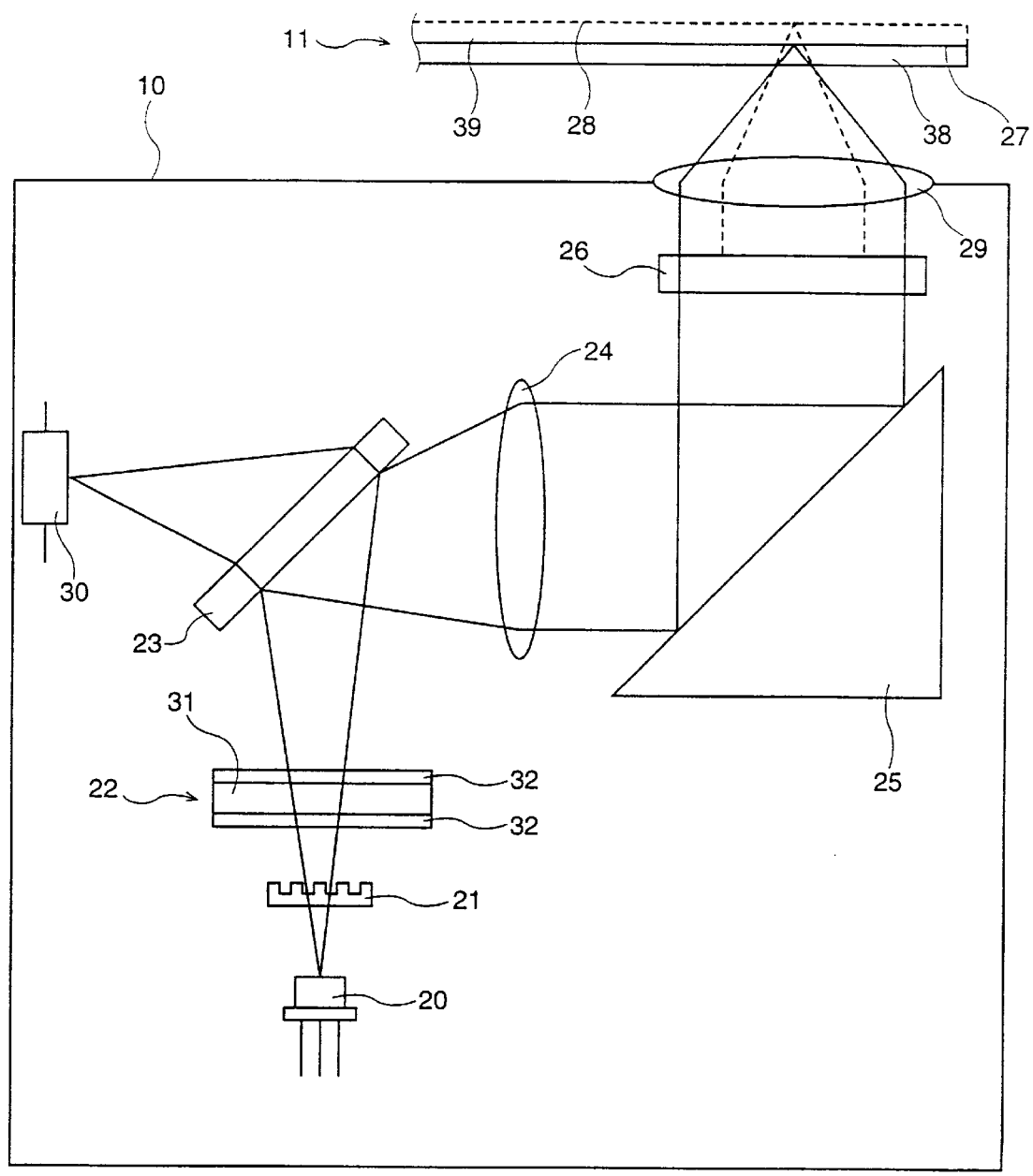
FIG. 2 is a block diagram showing an optical system of the optical pickup device shown in FIG. 1.

Referring to FIG. 2, the optical pickup device 10 includes a semiconductor laser 20, a diffraction grating 21, a plane of polarization rotating unit 22 for rotating plane of polarization of the laser beam, a half mirror 23, a collimator lens 24, a rising mirror 25, a polarization selecting unit 26 for intercepting only that laser beam which is polarized in a specific direction, an objective lens 29 for converging laser beam to a signal recording surface 27 or 28 of an optical disk 11, and a photodetector for detecting reflected light from the signal recording surface 27 or 28.

A plane of polarization rotating unit 22 includes a twisted nematic liquid crystal 31, and transparent electrodes 32, 32 for applying a voltage to liquid crystal 31. Objective lens 29 is designed such that the laser beam is focused on the signal recording surface 27 of the DVD, and has a numerical aperture of 0.6 (tolerance ±0.05).

Figure 3:
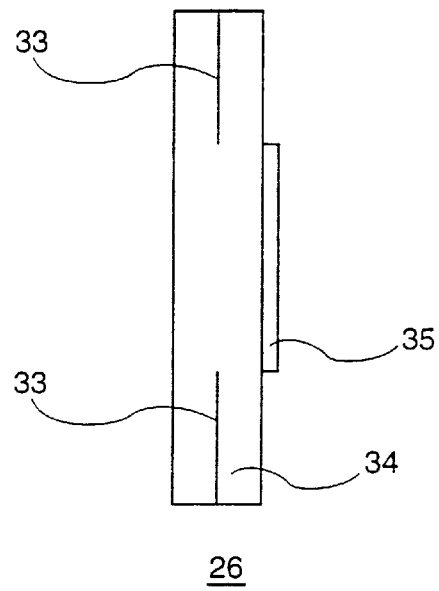
FIG. 3 is a side view of a polarization selecting unit shown in FIG. 2.

Referring to FIG. 3, polarization selecting unit 26 includes a ring-shaped polarization film 33, two transparent glass plates 34 between which polarization film 33 is held, and a filter 35 adhered at a central portion of glass plates 34 where polarization film 33 is absent. Filter 35 is to lower transmittance of the laser beam, and it does not have any polarization selectivity. Polarization film 33 transmits only such laser beam that is polarized in a specific direction. However, its transmittance is about 70 to about 90%. Filter 35 is adhered on glass plate 34 so as to lower the transmittance of the central portion to the same extent as that of the outer peripheral portion. In place of transparent glass plate 34, a transparent body having superior optical characteristics such as a plate formed of a resin such as polycarbonate, PMMA or the like may used.

Figure 4:
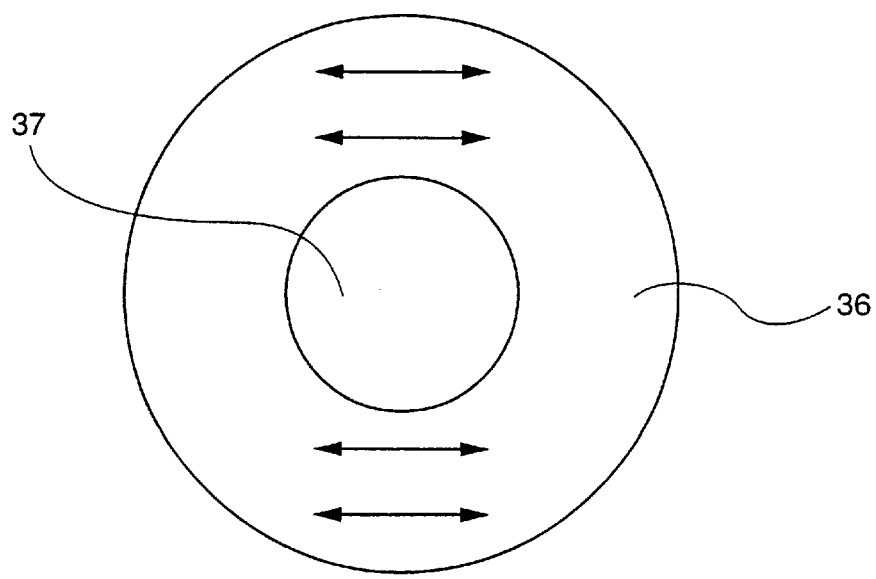
FIG. 4 is a front view of the polarization selecting unit shown in FIG. 3.

Polarization characteristic of the polarization selecting unit 26 is shown by the arrows in FIG. 4. More specifically, at an outer peripheral portion 36 of polarization selecting unit 26, only that laser beam which is polarized in a specific direction by polarizing film 33 is transmitted by about 70 to about 90%. Meanwhile, at the central portion 37, laser beam polarizing in any direction is transmitted with similar transmittance (70–90%) as at the outer peripheral portion 36. In FIG. 4, only that laser beam which is polarized in the lateral direction is transmitted through the outer peripheral portion 36. Assuming that the numerical aperture of objective lens 29 is 0.6 (tolerance ±0.05) and effective beam diameter thereof is 4 mm, the diameter of the central portion 37 is set to 2.3 (tolerance ±0.2) mm so that effective numerical aperture of objective lens 29 attains to 0.35 (tolerance ±0.05). When the effective beam diameter is not 4 mm, the diameter of the central portion 37 is set such that the effective numerical aperture of the objective lens 29 attains 0.35.

Here, an operation of reproducing a DVD by optical pickup device 10 shown in FIG. 2 will be described. When a DVD is to be reproduced, a voltage is applied to a transparent electrode 32 of plane of polarization rotating unit 22. As a result, laser beam polarized in a direction parallel to the sheet emitted from semiconductor laser 20 enters plane of polarization rotating unit 22 through diffraction grating 21, and it is transmitted as it is, with its plane of polarization not rotated by the plane of polarization rotating unit 22. The transmitted laser beam is reflected by half mirror 23, made parallel by a collimator lens 24 and reflected by a rising mirror 25 to be vertical with respect to the signal recording surface 27 or 28 of optical disk 11. The reflected laser beam enters polarization selecting unit 26, is entirely transmitted without being intercepted by polarization selecting unit 26, and it enters objective lens 29. The entered laser beam is condensed by objective lens 29 and directed to signal recording surface 27 through transparent substrate 38 of the DVD. The laser beam reflected from signal recording surface 27 returns through objective lens 29, polarization selecting unit 26, rising mirror 25 and collimator lens 24 to half mirror 23. Half of the returning laser beam is reflected by half mirror 23 and the remaining half is detected by photodetector 30, whereby a reproduction signal is generated. Here, the spot diameter of the laser beam on signal recording surface 27 is 0.9 (tolerance ±0.1) μm.

Meanwhile, when a CD is to be reproduced, voltage is not applied to transparent electrode 32 of plane of polarization rotating unit 22. As a result, the laser beam polarized in a direction parallel to the sheet emitted from the semiconductor laser 20 enters the plane of polarization rotating unit 22 through diffraction grating 21, and is transmitted with its plane of polarization rotated by 90° by plane of polarization rotating unit 22. Consequently, the laser beam which has been transmitted through plane of polarization rotating unit 22 is polarized in a direction vertical to the sheet. The transmitted laser beam is reflected by half mirror 23, made parallel by collimator lens 24 and enters, through rising mirror 25, to the polarization selecting unit 26. Of the entering laser beam, outer peripheral portion is intercepted by polarization selecting unit 26, and only the central portion is transmitted through polarization selecting unit 26. The laser beam (represented by the dotted line in FIG. 2) which has been transmitted through polarization selecting unit 26 is condensed by objective lens 29, and is directed to the signal recording surface 28 through transparent substrate 39 of the CD. At this time, the outer peripheral portion of the laser beam is intercepted such that effective numerical aperture of objective lens 29 attains to 0.35 (tolerance ±0.05). The spot diameter of the laser beam on the CD is 1.5 (tolerance ±0.1) μm. Except these, the operation is the same as described above, and hence description is not repeated.

In the foregoing, an example of a DVD/CD compatible optical pickup device has been described to show usefulness of the optical disk in accordance with a first embodiment, which will be described later. However, the optical disk in accordance with the first embodiment is not limited to the above described optical pickup device. It may be utilized to check an optical pickup device which is capable of reproducing both DVD and CD in accordance with other methods.

Now, it is necessary to check whether the optical pickup device 10 structured as described above can actually reproduce both DVD and CD. However, it takes long time and prevents quick checking if a DVD and a CD are mounted on a reproducing apparatus in turn and respective optical disks are reproduced so as to check compatibility of the manufactured optical pickup device. The first embodiment allows checking of DVD and CD compatibility by using one optical disk.

Figure 5:
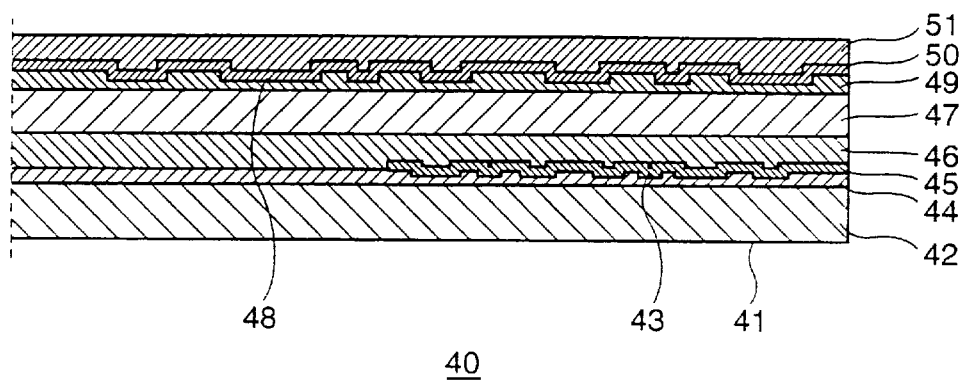
FIG. 5 is a cross section showing a structure of an optical disk in accordance with a first embodiment of the present invention.

Referring to FIG. 5, the optical disk in accordance with the first embodiment includes a transparent substrate 42 formed of glass and having a main surface 41, a photo polymer (hereinafter referred to as "2P") ultraviolet curing resin 44 formed on transparent substrate 42 and having a signal recording region 43, a reflection film 45 formed of aluminum on signal recording region 43, adhesion ultraviolet curing resin 46 formed on reflection film 45 and ultraviolet curing resin 44, a transparent substrate 45 formed of glass on ultraviolet curing resin 46, a 2P ultraviolet curing resin 49 formed on transparent substrate 47 and having a signal recording region, a reflection film 50 formed of aluminum on CD signal recording region 48, and a protective film 51 formed of a ultraviolet curing resin on reflection film 50. Reflection film 45 may be formed of a metal, a metal oxide or a dielectric, other than aluminum.

Signal recording region 43 is formed substantially parallel to main surface 41 and is formatted in accordance with the DVD standard shown in Table 1. Therefore, in the following, this region will be referred to as a DVD signal recording region. Signal recording region 48 is formed substantially parallel to main surface 41 and is formatted in accordance with the CD standard shown in Table 1. Therefore, in the following, this region will be referred to as a CD signal recording region. Distance between DVD signal recording region 43 and main surface 41 is 0.6 (tolerance ±0.05) mm. Distance between CD signal recording region 48 and main surface 41 is 1.2 (1.1–1.3) mm.

Figure 6:
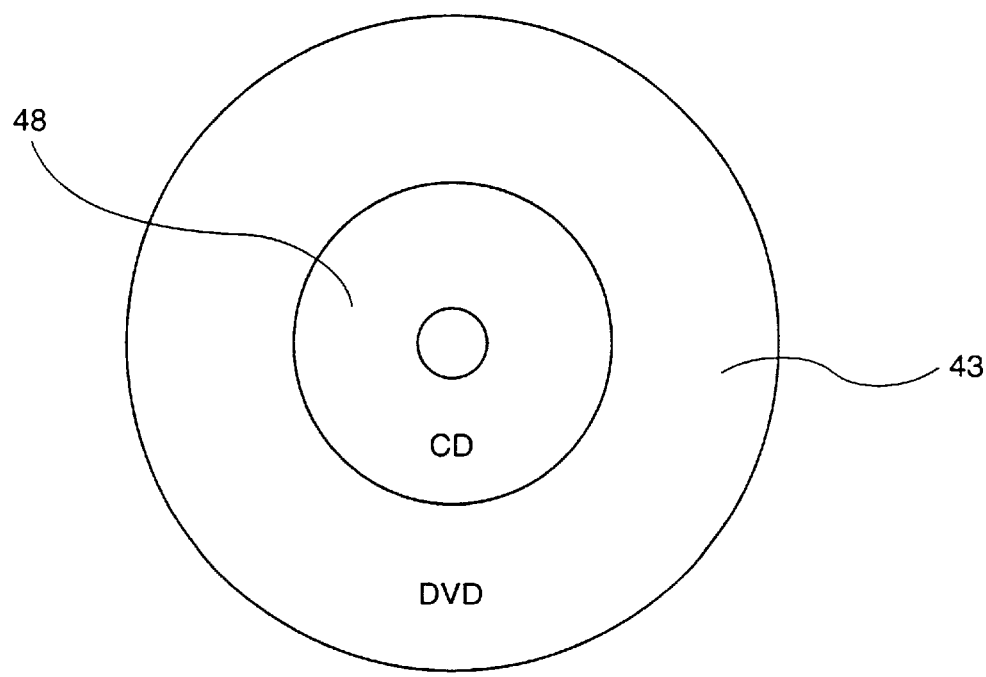
FIG. 6 is a plan view of the optical disk shown in FIG. 5.

As shown in FIG. 6, DVD signal recording region 43 is formed on an outer periphery of optical disk 40. CD signal recording region 48 is formed entirely over optical disk 40.

The thickness of reflection film 45 is set such that it has reflectance of 20 to 40%. As for reflection film 50, it is set such that the film has reflectance not smaller than 70%.

In short, optical disk 40 is fabricated by adhering two optical disks each having the thickness of 0.6 mm by ultraviolet curing resin 46, so that signals can be reproduced both from the regions 43 and 48 with laser beam irradiation from the side of main surface 41.

Figure 7:
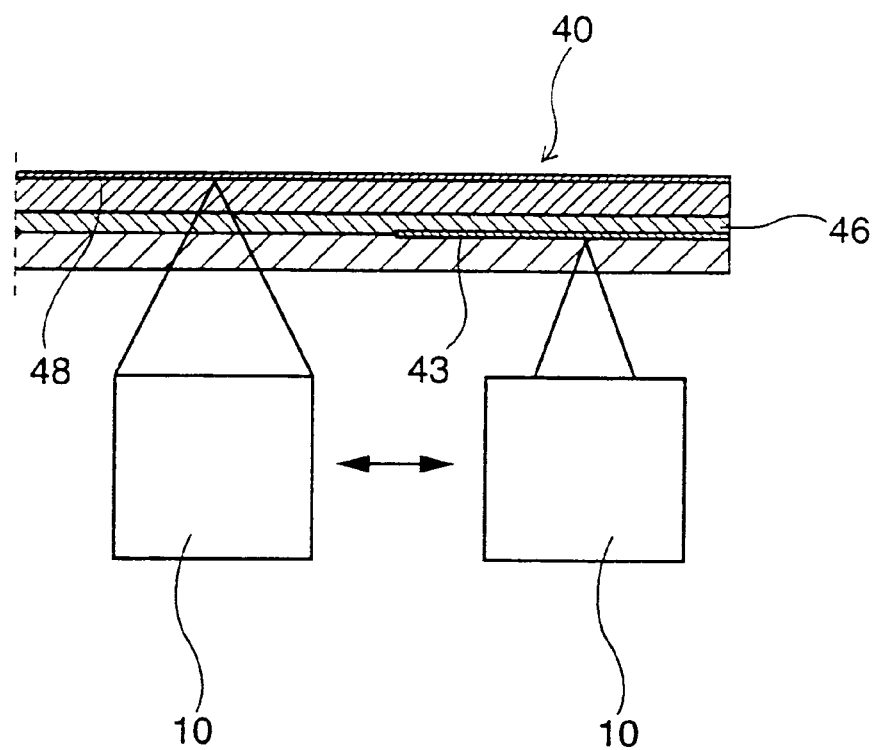
FIG. 7 is an illustration showing the method of checking compatibility of the optical pickup device using the optical disk shown in FIGS. 5 and 6.

Next, the method of checking compatibility of the optical pickup device 10 using optical disk 40 structured as above will be described. Optical disk 40 is mounted on a reproducing apparatus. Referring to FIG. 7, DVD signal recording region 43 is irradiated with a laser beam from optical pickup device 10, and whether optical pickup device 10 is capable of correctly reproducing a signal from DVD signal recording region 43 is determined. After determination, optical pickup device 10 is moved from DVD signal recording region 43 to CD signal recording region 48. After movement, CD signal recording region 48 is irradiated with a laser beam from optical pickup device 10, and whether or not optical pickup device 10 is capable of correctly reproducing a signal from CD signal recording region 48 is determined. Whether or not a correct reproduction signal is obtained is determined by detecting an eye pattern, a jitter or the like, for example. As a result, when good reproduction signals are obtained both from signal recording regions 43 and 48, it is determined that optical pickup device 10 is capable of DVD and CD compatible reproduction. Though a reproduction signal from DVD signal recording region 43 is checked first and thereafter reproduction signal from CD signal recording region 48 is checked here, the reproduction signal from CD signal recording region 48 may be checked first and the reproduction signal from DVD signal recording region 43 may be checked thereafter.

As described above, according to the first embodiment, since optical disk 40 has signal recording region 43 formatted in accordance with the DVD standard and a signal recording region formatted in accordance with the CD standard, compatibility of optical pickup device 10 can be checked by using only one optical disk 40. Further, signals can be reproduced from both signal recording regions 43 and 48 by laser irradiation from one direction, it is not necessary to put the optical disk upside down during checking. As a result, time necessary for checking can be significantly reduced.

Further, since CD signal recording region 48 is formed entirely over the surface, patterning is not necessary, and therefore manufacturing step is not complicated.

Further, since transparent substrate 42 is formed of glass, warp or the like can be suppressed to the minimum even when optical disk 40 is used frequently for checking. Therefore, optical disk 40 has improved durability.

Second Embodiment

Figure 8:
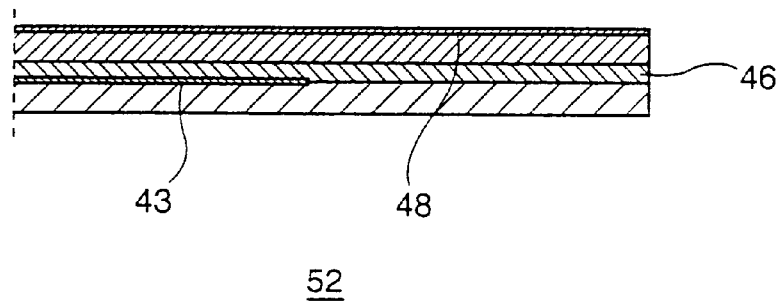
FIGS. 8 to 15 are cross sections showing structures of optical disks in accordance with the second to ninth embodiments of the present invention.

Though DVD signal recording region 43 is formed on the outer periphery of optical disk 40 in the first embodiment described above, it may be formed on an inner periphery of an optical disk 52 in accordance with the second embodiment, as shown in FIG. 8.

Third Embodiment

Figure 9:
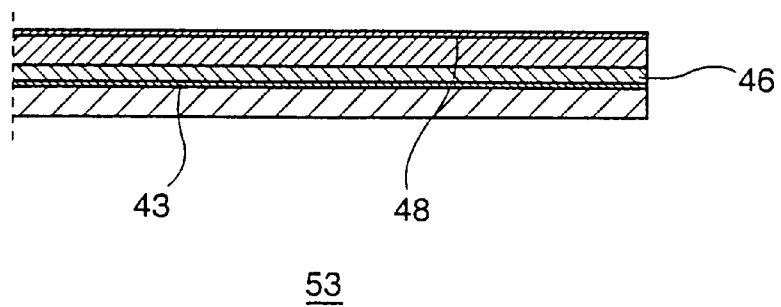

Though DVD signal recording region 43 is formed partially in the first and second embodiments above, it may be formed entirely over the surface of an optical disk 53 in accordance with a third embodiment, as shown in FIG. 9. Even when DVD signal recording region 43 is formed on the entire surface, part of the laser beam is transmitted through DVD signal recording region 43 and reaches CD signal recording region 48, as DVD signal recording region has reflectance of 20 to 40%. Therefore, a signal from CD signal recording region 48 can be reproduced.

According to the third embodiment, signal recording regions 43 and 48 do not require patterning. Therefore, as compared with the first and second embodiments, manufacturing steps can be simplified.

Fourth Embodiment

Figure 10:
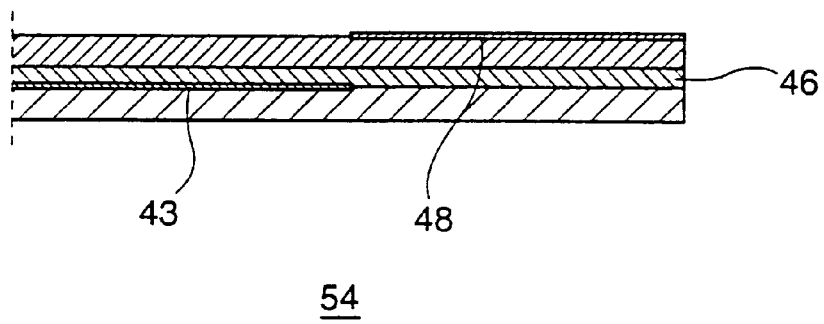

In the first to third embodiments above, CD signal recording region 48 is formed over the entire surface of optical disks 40, 52 and 53. However, it may be formed only on the outer periphery of an optical disk 54 as in the fourth embodiment shown in FIG. 10. In the second embodiment shown in FIG. 8, CD signal recording region 48 is overlapped with the DVD signal recording region 43 at the inner periphery of optical disk 52. However, the overlapped region is not necessary inherently. Therefore, by patterning CD signal recording region 48, it may be formed only on the outer periphery of optical disk 54 as shown in FIG. 10.

On the contrary, DVD signal recording region 43 may be formed only on the outer periphery of the optical disk and CD signal recording region 48 may be formed only on the inner periphery of the optical disk.

Fifth Embodiment

Figure 11:
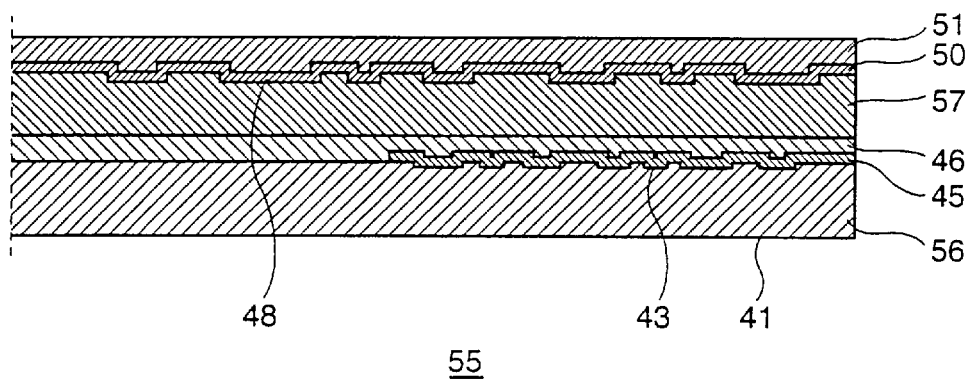

In the first embodiment above, transparent substrates 42 and 47 are formed of glass so as to improve durability. However, these may be formed of a polycarbonate resin as in the fifth embodiment shown in FIG. 11. An optical disk 55 in accordance with the fifth embodiment includes a transparent substrate 56 formed of a polycarbonate resin having DVD signal recording region 43 formed on the outer periphery, a protection film 45 formed on DVD signal recording region 43, adhesion ultraviolet curing resin 46 formed on reflection film 45 and transparent substrate 56, a transparent substrate 57 formed of a polycarbonate resin on resin 46 and having CD signal recording region 48 formed on the entire surface, a reflection film 50 formed on CD signal recording region 48, and protective film 51 formed on reflection film 50.

According to the fifth embodiment, since transparent substrates 56 and 57 are formed of polycarbonate resin, DVD signal recording region 43 and CD signal recording region 48 can be directly formed on transparent substrates 56 and 57. As a result, optical disk 55 in accordance with the fifth embodiment can be manufactured easier than optical disk 40 in accordance with the first embodiment shown in FIG. 5.

Sixth Embodiment

The first to fifth embodiments above are directed to an optical disk for checking single layer DVD and CD compatibility, while the sixth embodiment is directed to an optical disk for checking two layer DVD and CD compatibility.

Figure 12:
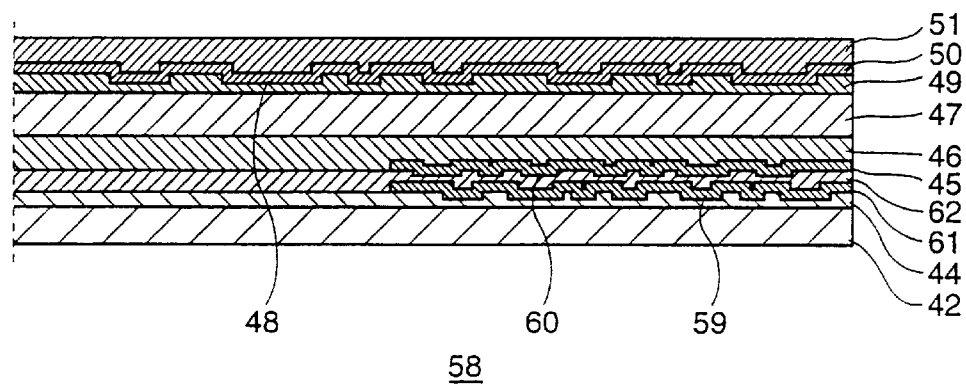

Referring to FIG. 12, in an optical disk 58 in accordance with the sixth embodiment, the DVD signal recording region includes a first signal recording layer 59, a transparent intermediate layer 62 formed on the first signal recording layer 59, and a second signal recording layer 60 formed on transparent intermediate layer 62. The first signal recording layer 59 is formed on 2P ultraviolet curing resin 44. On the first signal recording layer 59, a semitransparent film 61 formed of gold, silicon carbide or the like is formed. Transparent intermediate layer 62 is formed of 2P ultraviolet curing resin, on semitransparent film 61 and ultraviolet curing resin 44. Transparent intermediate layer 62 has a thickness of 10–20 $\mu$m. The second signal recording layer 62 is formed on transparent intermediate layer 62. On the second signal recording layer 62, reflection film 45 of aluminum is formed. Here, an adhesion ultraviolet curing resin may be used in place of 2P ultraviolet curing resin of transparent intermediate layer 62 and a 2P ultraviolet curing resin may be used in place of adhesion ultraviolet curing resin 46.

By the optical disk 58 in accordance with the sixth embodiment, it is possible to check two layer DVD and CD compatibility.

Seventh Embodiment

Figure 13:
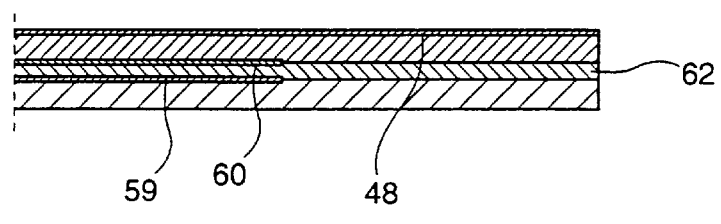

In the sixth embodiment above, the first and second signal recording layers 56 and 60 are formed on the outer periphery of optical disk 58. In the seventh embodiment shown in FIG. 13, the first and second signal recording layers 59 and 60 are formed on the inner periphery of an optical disk 63.

Eighth Embodiment

Figure 14:
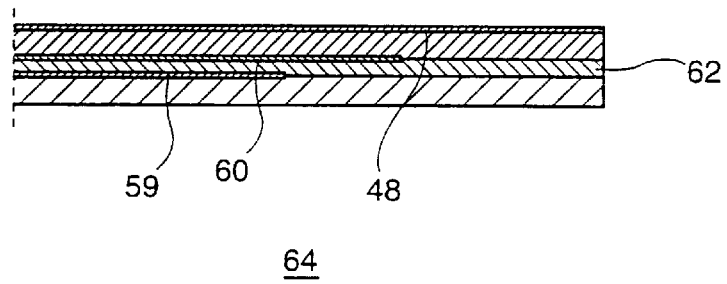

In optical disks 58 and 63 in accordance with the sixth and seventh embodiments above, outer diameter of the first signal recording layer 59 is equal to the outer diameter of the second signal recording layer 60. In an optical disk 64 in accordance with the eighth embodiment shown in FIG. 14, outer diameter of the first signal recording layer 59 is smaller than that of the second signal recording layer 60. In this manner, the first signal recording layer 59 may overlap not entirely but partially with the second signal recording layer 60.

Ninth Embodiment

Figure 15:
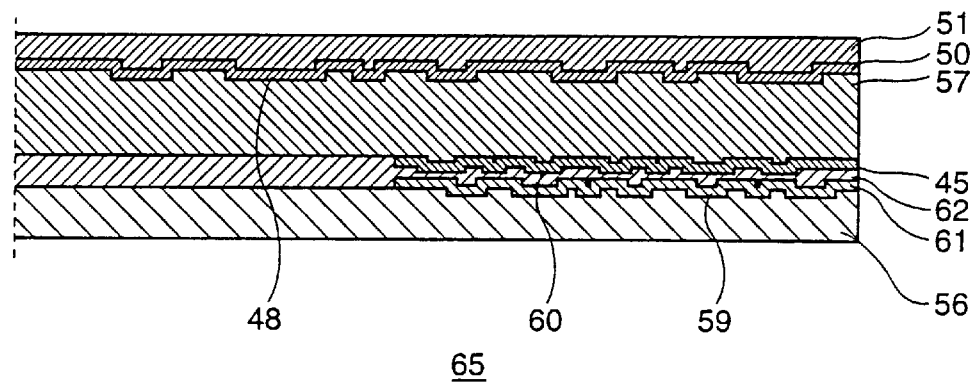

In the sixth embodiment shown in FIG. 12, transparent substrates 42 and 47 are formed of glass. However, similar to the fifth embodiment shown in FIG. 11, in an optical disk 65 in accordance with a ninth embodiment shown in FIG. 15, transparent substrates 56 and 57 are formed of polycarbonate resin.

According to the ninth embodiment, the first signal recording layer 59 is directly formed on transparent substrate 56 and the second signal recording layer 60 and the CD signal recording region 48 are directly formed on transparent substrate 57. Therefore, optical disk 65 can be manufactured easier than optical disk 58 in accordance with the sixth embodiment.

Tenth Embodiment

In the first to ninth embodiments above, signal recording region 48 is formatted in accordance with the CD standard. Alternatively, it may be formatted in accordance with the CD-R (Compact Disk-Recordable) standard. Table 2 below shows standards and conditions for reproduction of DVD and CD-R.

TABLE 2

| Type | | DVD | CD-R |
|---|---|---|---|
| Standard | Substrate Thickness | 0.6 mm (0.55–0.65 mm) | 1.2 mm (1.1–1.3 mm) |
| | Shortest Pit Length | 0.40 μm (0.3–0.5 μm) | 0.90 μm (0.80–1.0 μm) |
| | Track Pitch | 0.74 μm (0.73–0.75 μm) | 1.6 μm (1.5–1.7 μm) |
| | Reflectance | at least 20–40% | at least 60–70% |
| | | 70% | |
| Condition for Reproduction | Spot Diameter | 0.9 μm (0.85–0.95 μm) | 1.5 μm (1.4–1.6 μm) |
| | Numerical Aperture | 0.60 (0.55–0.65) | 0.45 (0.40–0.50) |
| | Wavelength | 635 nm (620–650 nm) | 780 nm (765–795 nm) |

As is apparent from the table, CD-R standard is generally similar to CD standard, except that the reflectance is higher than 60–70%. Further, a laser beam having the wavelength of 780 (tolerance ±15) nm is used for reproduction.

An example of an optical pickup device capable of reproducing both DVD and CD-R will be described. Different from DVD/CD compatible optical pickup device 10 shown in FIG. 2, a DVD/CD-R compatible optical pickup device 66 shown in FIG. 16 includes a semiconductor laser 69 which include a laser element 67 for generating a laser beam having the wavelength of 635 (tolerance ±15) nm and a laser element 68 for generating a laser beam having the wavelength of 780 (tolerance ±15) nm. Optical pickup device 66 includes two objective lenses 70 and 71. Objective lens 70 is designed for DVD and has numerical aperture of 0.6 (tolerance ±0.05). Objective lens 71 is designed for CD-R and has numerical aperture of 0.45 (tolerance ±0.05). Objective lenses 70 and 71 are switched in accordance with the optical disk to be reproduced (DVD or CD-R).

When a DVD is reproduced, laser element 67 is activated and objective lens 70 is moved to a prescribed position. Consequently, laser beam having the wavelength of 635 nm emitted from laser element 67 passes through objective lens 70 and is focused on DVD signal recording surface 27.

Meanwhile, when a CD-R is reproduced, laser element 68 is activated and objective lens 71 is moved to a prescribed position. Therefore, a laser beam having the wavelength of 780 nm emitted from laser element 68 passes through objective lens 71 and is focused on CD-R signal recording surface 28. Since CD-R allows writing once, it is possible that optical pickup device 66 records signals by using the laser beam having the wavelength of 780 nm. Except these points, the operation is similar to that of optical pickup device 10 shown in FIG. 2. Therefore, description thereof is not repeated.

Eleventh Embodiment

In the first to ninth embodiments above, signal recording region 48 is formatted in accordance with the CD standard and in the tenth embodiment, it is formatted in accordance with the CD-R standard. Alternatively, it may be formatted in accordance with the MO (magneto optical) disk standard. Table 3 below shows DVD and MO disk standards and conditions for reproduction.

TABLE 3

| Type | | DVD | MO disk |
|---|---|---|---|
| Standard | Substrate Thickness | 0.6 mm (0.55–0.65 mm) | 1.2 mm (1.1–1.3 mm) |
| | Shortest Pit Length | 0.40 μm (0.3–0.5 μm) | 0.25 μm (0.20–0.30 μm) |
| | Track Pitch | 0.74 μm (0.73–0.75 μm) | 0.7 μm (0.5–0.8 μm) |
| | Reflectance | at least 20–40% | at least 15–25% |
| | | 70% | |
| Condition for Reproduction | Spot Diameter | 0.9 μm (0.85–0.95 μm) | 1.1 μm (0.8–1.2 μm) |
| | Numerical Aperture | 0.60 (0.55–0.65) | 0.55 (0.50–0.60) |
| | Wavelength | 635 nm (620–650 nm) | 680(665–695) nm or 780(765–795) nm |

As is apparent from the table, according to the MO disk standard, the shortest domain length is 0.25 (tolerance ±0.05) μm, track pitch is 0.7 (0.5–0.8) μm and reflectance is higher than 15–25%.

The signal recording region formatted in accordance with the MO disk standard includes a recording layer formed on a transparent substrate and a reproduction layer formed on the recording layer. Preferably, it further includes a nonmagnetic layer formed between the recording layer and the reproduction layer. Recording layer is formed of (1)

TbFeCo, (2) an alloy of one selected from the group consisting of Fb, Gd, Dy, Nd and Ho and one selected from the group consisting of Fe, Co and Ni, or (3) a multi-layered film. The reproduction layer is formed of one selected from the group consisting of GdFeCo, GdFe, GdCo and $R_3Fe_5O_{12}$ (R=Y or a rare earth element). The non-magnetic layer is formed of an alloy including at least one selected from the group consisting of SiN, AlN, TiN, $SiO_2$, $Al_2O_3$, SiC, TiC, ZnO, SiAlON, ITO, $SnO_2$, and Al.

Figure 16:
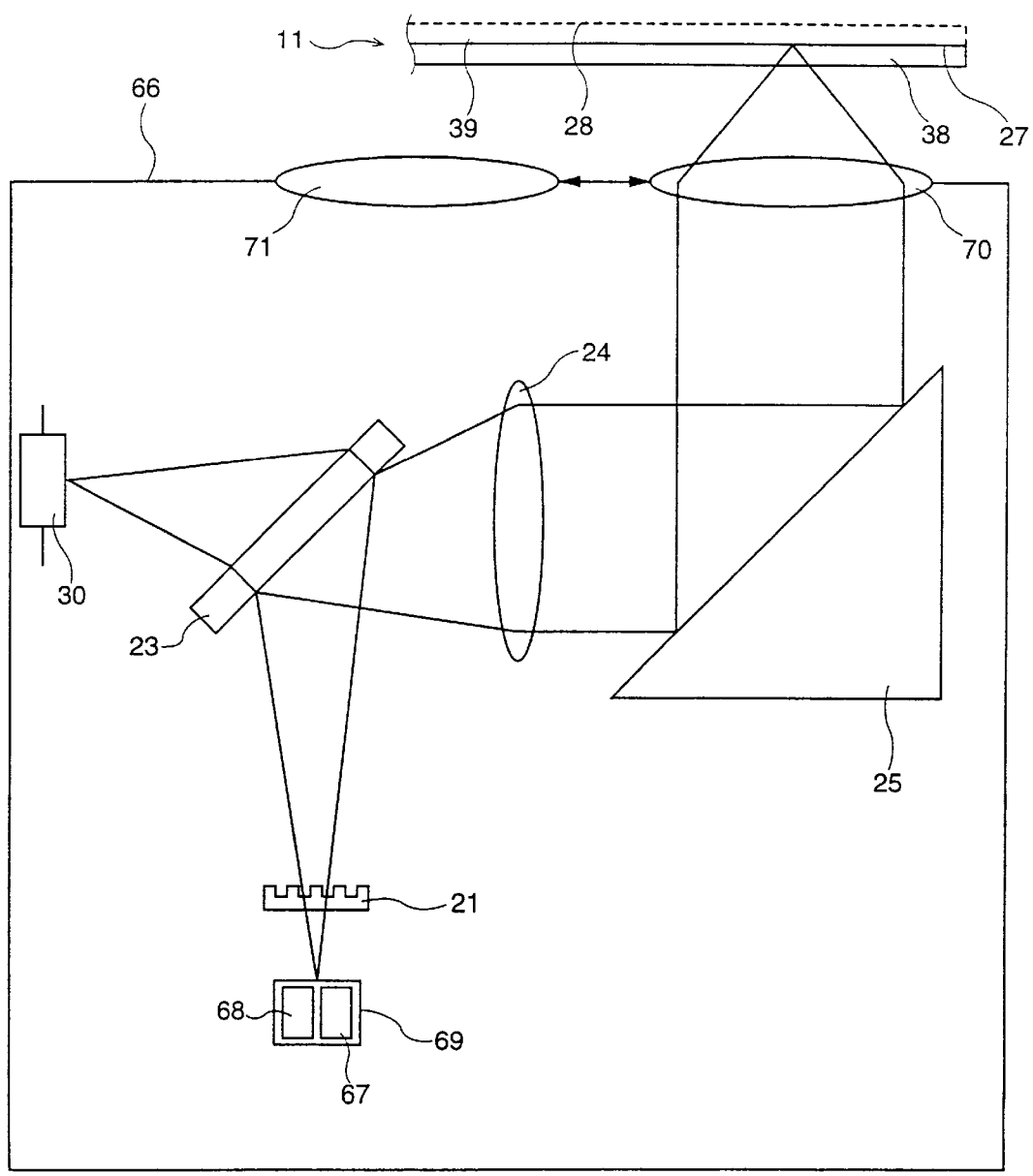
FIG. 16 is a block diagram showing an optical system of a DVD/CD-R compatible optical pickup device.

DVD/MO disk compatible optical pickup device is structured in the similar manner as DVD/CD-R compatible optical pickup device 66 shown in FIG. 16. At the time of recording and/or reproducing of an MO disk, laser beam having the wavelength of 680 or 780 (tolerance ±15) nm is generated by laser element 68, and objective lens 71 having numerical aperture of 0.55 (tolerance ±0.05) is moved to a prescribed position. Other operations are the same as described above. Therefore, description is not repeated.

Twelfth Embodiment

Figure 17:
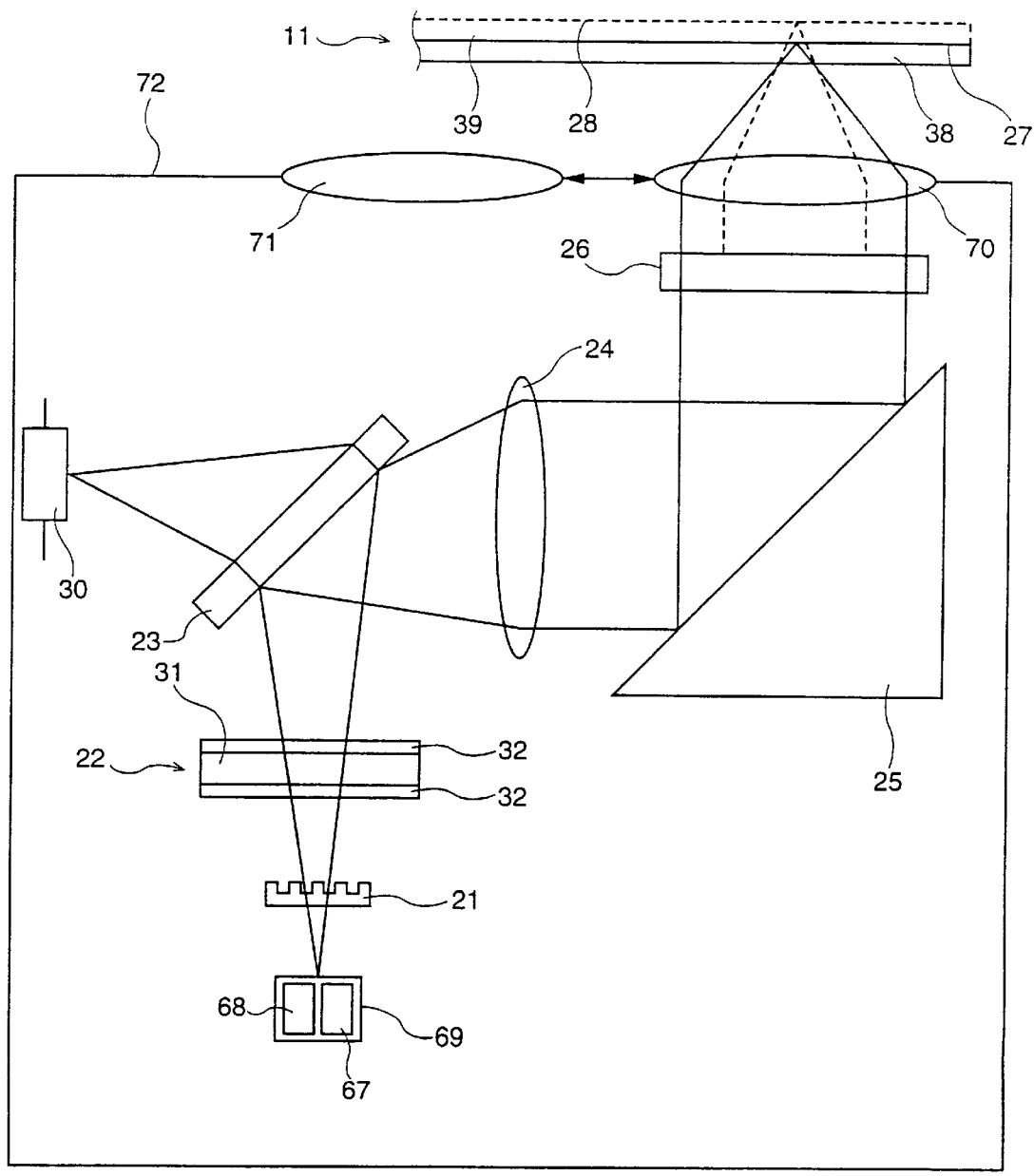
FIG. 17 is a block diagram showing an optical system of a DVD/CD/CD-R compatible optical pickup device.

The first to eleventh embodiments above are directed to an optical disk for checking compatibility of two different optical disks. The twelfth embodiment relates to an optical disk for checking compatibility among three different optical disks. An optical pickup device 72 shown in FIG. 17 is capable of reproducing DVD, CD and CD-R. Optical pickup device 72 includes, in addition to the structure of DVD/CD compatible optical pickup device 10 shown in FIG. 2, another objective lens 71 as in the DVD/CD-R compatible optical pickup device 66 shown in FIG. 16.

When a DVD is reproduced, laser element 67 generating a laser beam having the wavelength of 635 nm is activated, objective lens 70 is moved to a prescribed position, and a voltage is applied to transparent electrode 32 of plane of polarization rotating unit 22. Consequently, similar to DVD/CD compatible optical pickup device 10 shown in FIG. 2, the laser beam is focused on DVD signal recording surface 27.

When a CD is reproduced, similar to reproduction of DVD described above, laser element 67 generating a laser beam having the wavelength of 635 nm is activated and objective lens 70 is moved to a prescribed position. However, voltage is not applied to transparent electrode 32 of plane of polarization rotating unit 22. Consequently, similar to DVD/CD compatible optical pickup device 10, the laser beam is focused on CD signal recording surface 28.

When a CD-R is reproduced, laser element 68 generating a laser beam having the wavelength of 780 nm is activated, objective lens 71 is moved to a prescribed position and a voltage is applied to transparent electrode 32 of plane of polarization rotating unit 22. Consequently, the laser beam which is polarized in a direction parallel to the sheet emitted from laser element 68 is transmitted with its plane of polarization not rotated by plane of polarization rotating unit 22. Therefore, similar to the DVD/CD-R compatible optical pickup device 66 shown in FIG. 16, the laser beam is focused on CD-R signal recording surface 28.

In order to check whether or not the optical pickup device 72 is capable of reproducing DVD, CD and CD-R, optical disk 72 in accordance with the twelfth embodiment shown in FIG. 18 includes, in addition to DVD signal recording region 43 and CD signal recording region 48, a signal recording region formatted in accordance with the CD-R standard (hereinafter referred to as "CD-R signal recording region") 74. CD-R signal recording region 74 is formed in the same plane as CD signal recording region 48. Therefore, distance between CD-R signal recording region 74 and main surface 71 is the same as the distance between CD signal recording region 48 and main surface 41. CD-R signal recording region 74 includes a recording film 75 including cyanine dye formed on ultraviolet curing resin 49. Recording film 75 of CD-R signal recording region 74 allows recording of signals once.

Figure 19:
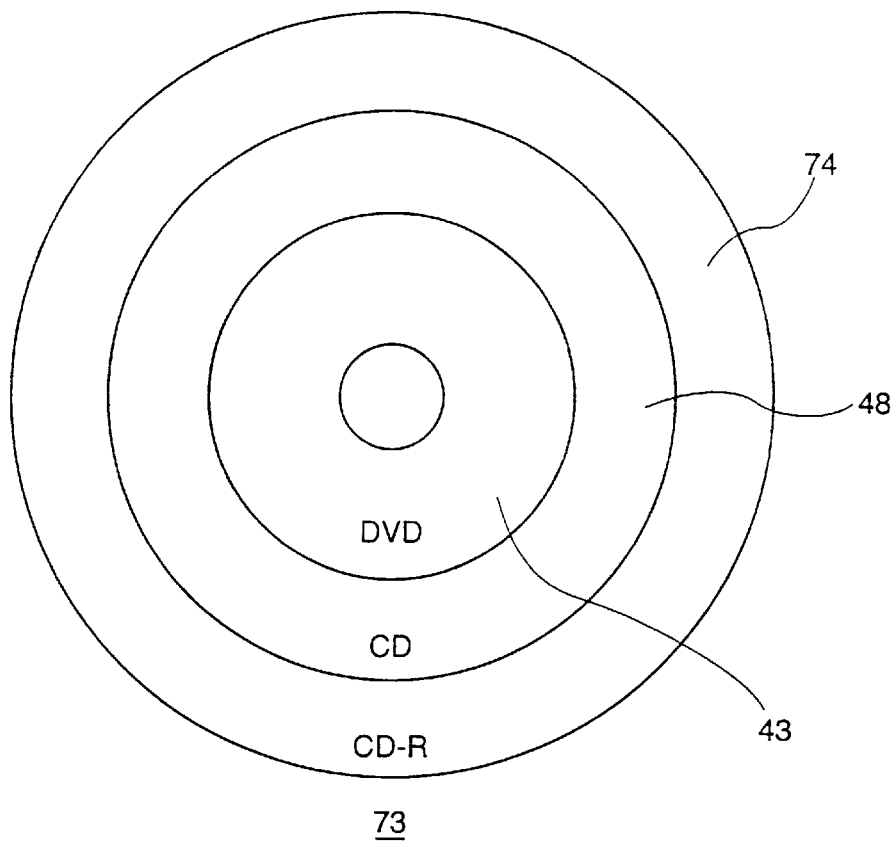
FIG. 19 is a plan view of the optical disk shown in FIG. 18.

As shown is FIG. 19, DVD signal recording region 43 is formed on the innermost periphery of optical disk 73. CD signal recording region 48 is formed overlapping the DVD signal recording region 43 on the inner periphery of optical disk 73. CD-R signal recording region 74 is formed on the outer periphery of optical disk 73.

In order to check compatibility of optical pickup device 72 shown in FIG. 17 by using optical disk 73 having the above described structure, first, DVD signal recording region 43 is irradiated with a laser beam from optical pickup device 72, and whether or not a signal from DVD signal recording region 43 can be reproduced by optical pickup device 72 is determined. Thereafter, optical pickup device is moved from DVD signal recording region 43 to CD signal recording region 48. Thereafter, CD signal recording region 48 is irradiated with a laser beam from optical pickup device 72, and whether a signal from CD signal recording region 48 can be reproduced by optical pickup device 72 is determined. Thereafter, optical pickup device 72 is moved from the CD signal recording region 48 to CD-R signal recording region 74. Finally, CD-R signal recording region 74 is irradiated with laser beam from optical pickup device 72, and whether a signal from CD-R signal recording region 74 can be reproduced by optical pickup device 72 is determined. Though the order of checking is DVD, CD and CD-R here, it is not limited to this order.

According to the twelfth embodiment, optical disk 73 includes DVD signal recording region 43, CD signal recording region 48 and CD-R signal recording region 74. Therefore, by using only one optical disk 73, it is possible to check whether optical pickup device 72 is capable of reproducing DVD, CD and CD-R.

Here, DVD signal recording region 43, CD signal recording region 48 and CD-R signal recording region 74 are formed in this order from the inner to outer periphery. However, these may be formed in opposite order. Alternatively, CD signal recording region 48 may be formed on the outer periphery, and CD-R signal recording region 74 may be formed on the inner periphery, overlapping DVD signal recording region 43.

Thirteenth Embodiment

Figure 20:
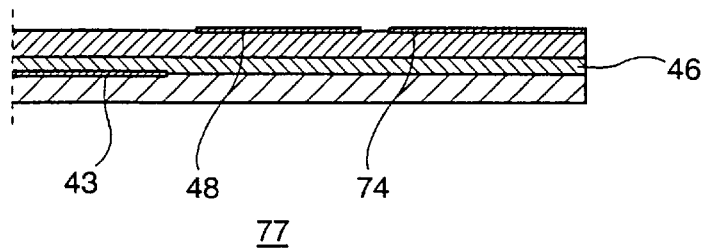
FIGS. 20 to 26 are cross sections showing structures of optical disks in accordance with thirteenth to nineteenth embodiments of the present invention.

Though CD signal recording region 48 is formed overlapping DVD signal recording region 43 in the twelfth embodiment above, the overlapping region is unnecessary. Therefore, it may be removed by patterning, as in an optical disk 77 in accordance with the thirteen embodiment shown in FIG. 20.

Fourteenth Embodiment

Figure 18:
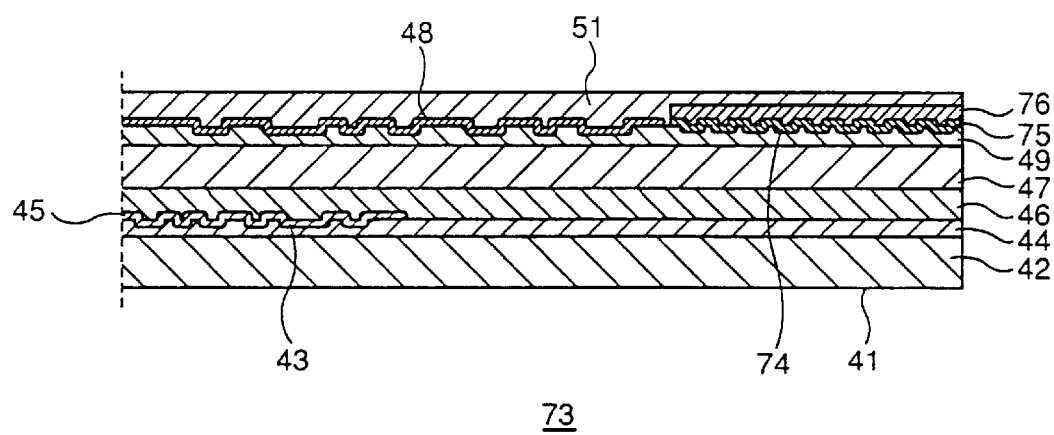
FIG. 18 is a cross sectional view showing a structure of an optical disk in accordance with a twelfth embodiment of the present invention.
Figure 21:
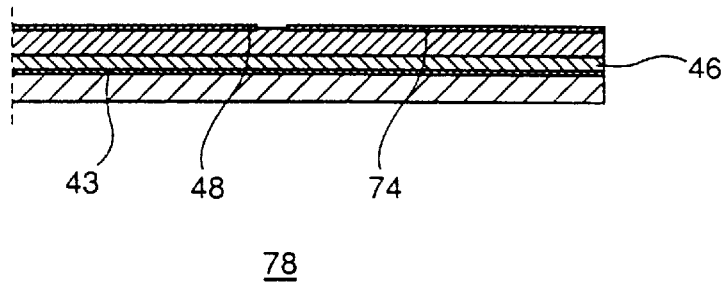

In the twelfth embodiment shown in FIG. 18, DVD signal recording region 43 is formed only on the inner periphery. However, it may be formed on the entire surface of optical disk 78 in accordance with the fourteenth embodiment shown in FIG. 21. Here, DVD signal recording region 43 is formed on the inner periphery and CD-R signal recording region 74 is formed on the outer periphery. However, CD signal recording region 48 may be formed on the outer periphery and CD-R signal recording region 74 may be formed on the inner periphery.

Fifteenth Embodiment

Figure 22:
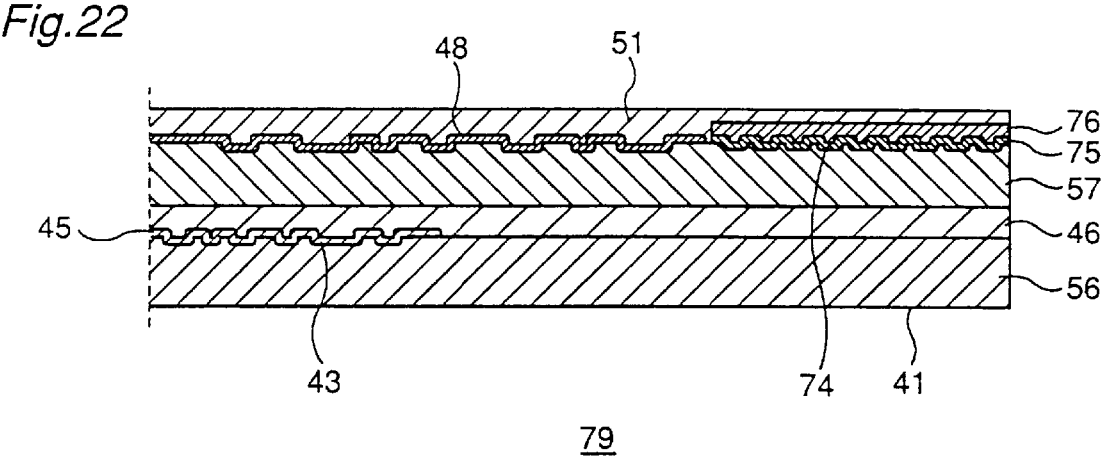

In the twelfth embodiment shown in FIG. 18, transparent substrate 42 is formed of glass so as to improve durability. However, it may be formed of a polysilicon resin, as in an optical disk 79 in accordance with the fifteenth embodiment shown in FIG. 22.

Sixteenth Embodiment

Figure 23:
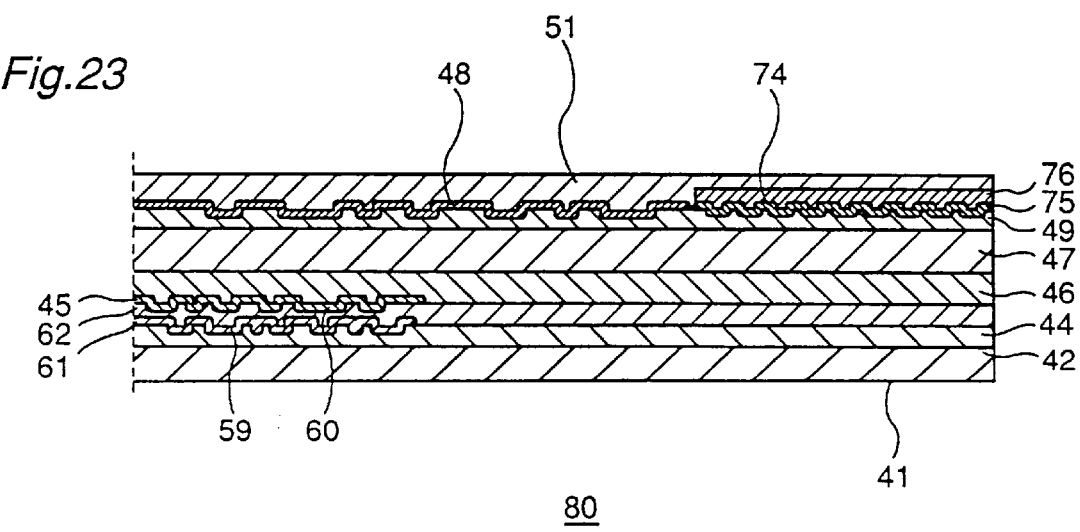

Though twelfth to fifteenth embodiments above are directed to an optical disk for single layer DVD, the sixteenth embodiment is directed to an optical disk of two layer DVD. Referring to FIG. 23, in an optical disk 80 in accordance with the sixteenth embodiment, DVD signal recording region 43 includes a first signal recording layer 59, a transparent intermediate layer 62 and a second signal recording layer 60.

Seventeenth Embodiment

Figure 24:
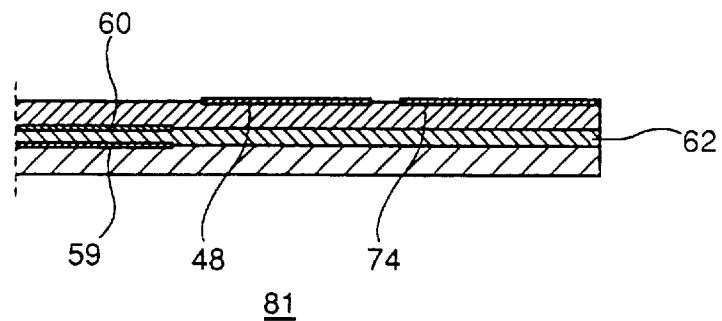

In the sixteenth embodiment, CD signal recording region 48 is formed overlapping signal recording layers 59 and 60 of DVD signal recording region. However, the overlapping region may be removed as in an optical disk 81 in accordance with the seventeenth embodiment shown in FIG. 24.

Eighteenth Embodiment

Figure 25:
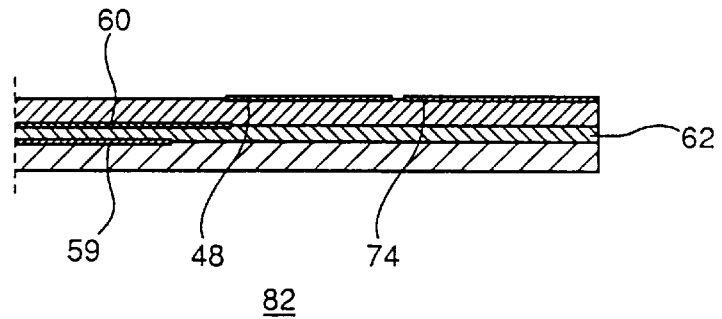

In the sixteenth and seventeenth embodiments, the outer diameter of the first signal recording layer 59 is equal to the outer diameter of the second signal recording layer 60. However, the outer diameter of the first signal recording layer 59 may be smaller than the outer diameter of the second signal recording layer 60 as in an optical disk 82 in accordance with the eighteenth embodiment shown in FIG. 25.

Nineteenth Embodiment

Figure 26:
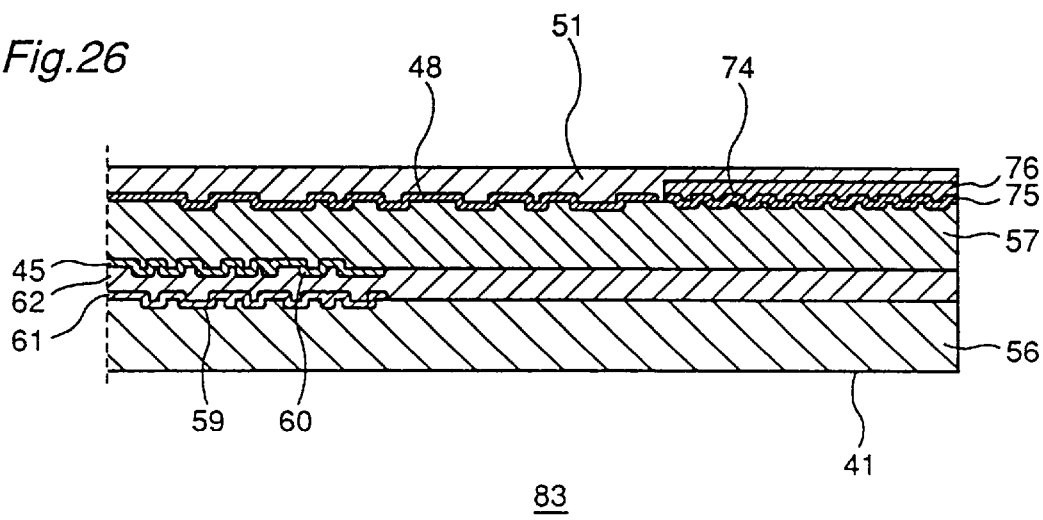

In the sixteenth embodiment shown in FIG. 23, transparent substrate 42 is formed of glass. However, a transparent substrate 56 may be formed of a polycarbonate resin as in an optical disk 83 in accordance with the nineteenth embodiment shown in FIG. 26.

Twentieth Embodiment

Figure 27:
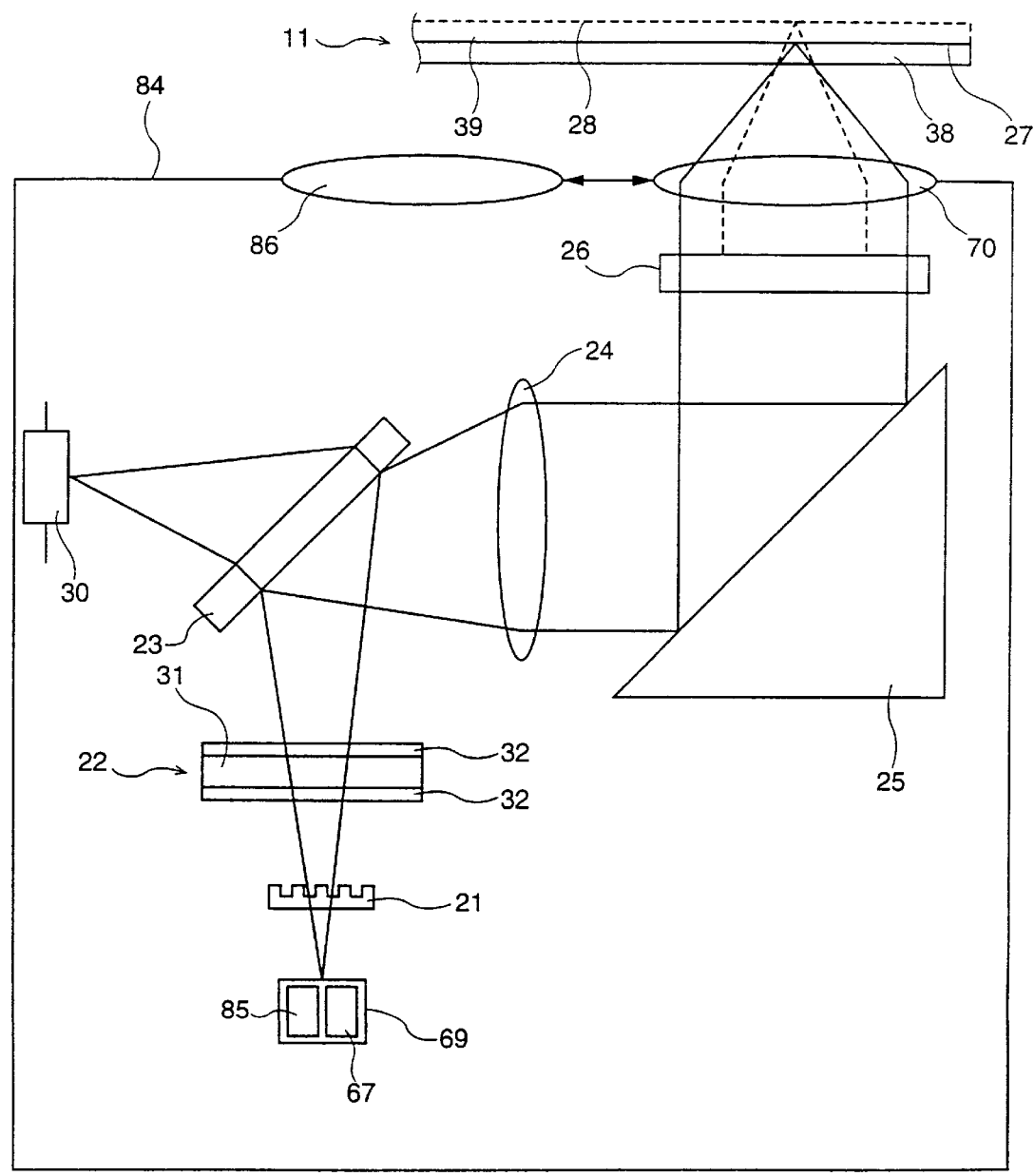
FIG. 27 is a block diagram showing an optical system of a DVD/CD/MO compatible optical pickup device.

The twelfth to nineteenth embodiments above are directed to an optical disk for checking a DVD/CD/CD-R compatible optical pickup device 72. However, the present invention may be directed to an optical disk for checking a DVD/CD/MO disk compatible optical pickup device 84 shown in FIG. 27. More specifically, an optical disk (not shown) in accordance with the twentieth embodiment includes, in place of the CD-R signal recording region 74 in accordance with the twelfth to nineteenth embodiments, a signal recording region formatted in accordance with the MO disk standard.

Here, an example of DVD/CD/MO disk compatible optical pickup device will be described. The optical pickup device 84 includes, in place of laser element 68 of optical pickup device 72 shown in FIG. 17, a laser element 85 for generating a laser beam having the wavelength of 680 or 780 (tolerance ±15) nm, and in place of objective lens 71 of optical pickup device 72, an objective lens 86 designed to focus a laser beam on a signal recording surface 28 of an MO disk and having a numerical aperture of 0.55 (tolerance ±0.05).

When an MO disk is reproduced, laser element 85 is activated, objective lens 86 is moved to a prescribed position and a voltage is applied to transparent electrode 32 of plane of polarization rotating unit 22. Accordingly, in the similar manner as in reproducing a CD-R by the optical pickup device 72, the laser beam which is polarized in a direction parallel to the sheet emitted from the laser element 85 is transmitted with its plane of polarization not rotated by plane of polarization rotating unit 22, and is focused on signal recording surface 28 of MO disk, through objective lens 86. Other operations are the same as those in optical pickup device 72. Therefore, description thereof is not repeated.

Other Embodiments

Table 4 below show types of signal recording regions which can be formed in the optical disk in accordance with the present invention.

TABLE 4

| 1.2 mm thickness | 0.6 mm thickness |
| --- | --- |
| CD(-DA) | Single layer DVD |
| CD-ROM | Two layer DVD |
| CD-R | Single layer DVD-ROM |
| CD-RW | Two layer DVD-ROM |
| MO disk | DVD-R |
| PC disk | DVD-RAM |

As shown in the table, optical disks having the thickness of 1.2 mm include CD(-DA), CD-ROM, CD-R, CD-RW (Compact Disk-Rewrite), MO disk and PC (Phase change) disk such as represented by a PD disk. Meanwhile, optical disks having the thickness of 0.6 mm include single layer DVD, two layer DVD, single layer DVD-ROM, two layer DVD-ROM, DVD-R (Digital Videodisk-Recordable) and DVD-RAM (Digital Videodisk-Random Access Memory).

In the first to ninth embodiments above, a combination of CD and single layer or two layer DVD has been described. In the tenth embodiment, a combination of CD-R and single or two layer DVD is described, in the eleventh embodiment, combination of an MO disk and single or two layer DVD is described, in the twelfth to nineteenth embodiments, a combination of CD, CD-R and a single or two layer DVD is described and in the twelfth embodiment, a combination of a CD, an MO disk and a single or two layer DVD is described. However, the present invention is applicable to optical disks having different combinations. According to the optical disks shown as examples in Table 4, there is 36 (=6×6) possible combinations of optical disks having two different signal recording regions. There is 90 (=$_6C_2$×6) combinations for optical disks having three different signal recording surfaces. Further, combination of optical disks not shown in Table 4 is also possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical recording medium, comprising:
   transparent substrates having respective main surfaces;
   a first signal recording region formed in one of said transparent substrates substantially parallel to one of the respective main surfaces and formatted in accordance with a first standard;
   a first reflection film formed on said first signal recording region on a side opposite to the one of the respective main surfaces of said one of said transparent substrates;

a second signal recording region formed in another one of said transparent substrates substantially parallel to another one of the respective main surfaces and formatted in accordance with a second standard; and a second reflection film formed on said second signal recording region on a side opposite to the another one of the respective main surfaces of said another one of said transparent substrates;

wherein the first and second signal recording regions respectively extend, along the respective main surfaces at different planes and lengths, in said transparent substrates thereof.

2. The optical recording medium according to claim 1, wherein distance between said first signal recording region and the one of the respective main surfaces of said one of said transparent substrates is shorter than distance between said second signal recording region and the another one of the respective main surfaces of said another one of said transparent substrates.

3. The optical recording medium according to claim 2, wherein said first signal recording region is formed partially in said one of said transparent substrates, and said second signal recording region is formed entirely in said another one of said transparent substrates.

4. The optical recording medium according to claim 2, wherein said first signal recording region is formed at least on an inner periphery in said one of said transparent substrates, and said second signal recording region is formed at least on an outer periphery in said another one of said transparent substrates.

5. The optical recording medium according to claim 2, wherein said first signal recording region is formed at least on an outer periphery in said one of said transparent substrates, and said second signal recording region is formed at least on an inner periphery of said another one of said transparent substrates.

6. The optical recording medium according to claim 2, wherein said first signal recording region includes a first signal recording layer, a transparent intermediate layer formed on said first signal recording layer, and a second signal recording layer formed on said transparent intermediate layer.

7. The optical recording medium according to claim 1, wherein said transparent substrates are formed of glass.

8. The optical recording medium according to claim 1, further comprising:

a third signal recording region formed in yet another one of said transparent substrates substantially parallel to yet another one of the respective main surfaces and formatted in accordance with a third standard; and a third reflection film formed on said third signal recording region on a side opposite to the yet another one of the respective main surfaces of said yet another one of said transparent substrates.

9. The optical recording medium according to claim 8, wherein distance between said first signal recording region and the one of the respective main surfaces of said one of said transparent substrates is shorter than distance between said second signal recording region and the another one of the respective main surfaces of said another one of said transparent substrates, and distance between said third signal recording region and the yet another one of the respective main surfaces of said yet another one of said transparent substrates is substantially equal to distance between said first or second signal recording region and the one or another one of the respective main surfaces.

10. An optical recording medium, comprising:

a first transparent substrate;

a first signal recording region formed on said first transparent substrate and formatted in accordance with a first standard;

a first reflection film formed on said first signal recording region;

a second transparent substrate formed on said first reflection film;

a second signal recording region formed on said second transparent substrate and formatted in accordance with a second standard; and a second reflection film formed on said second signal recording region, wherein said first and second signal recording regions formed on transparent substrates extend at different planes and lengths.

11. A method of checking an optical pickup device by using an optical recording medium including transparent substrates having respective main surfaces, a first signal recording parallel to one of the respective main surfaces and formatted in accordance with a first standard, a first reflection film formed on said first signal recording region on a side opposite to the one of the respective main surfaces of one of said transparent substrates, a second signal recording region formed in another one of said transparent substrates substantially parallel to another one of the respective main surfaces and formatted in accordance with a second standard, and a second reflection film formed on said second signal recording region on the side opposite to the another one of the respective main surfaces of said another one of said transparent substrates, said method comprising the steps of:

irradiating said first signal recording region with a laser beam from said optical pickup device for determining whether or not said optical pickup device is capable of reproducing a signal of said first signal recording region;

after said step of irradiating, moving said optical pickup device from said first signal recording region to said second signal recording region; and after said step of moving, irradiating said second signal recording region with a laser beam from said optical pickup device for determining whether said optical pickup device is capable of reproducing a signal of said second signal recording region, wherein the first and second signal recording regions respectively extend, along the respective main surfaces at different planes and lengths, in said transparent substrates thereof.

12. The optical recording medium according to claim 1, wherein recording density of said first signal recording region (43) is higher than recording density of said second signal recording region (48).

13. The optical recording medium according to claim 12, wherein shortest pit length of said first signal recording region (43) is shorter than shortest pit length of said second signal recording region (48).

14. The optical recording medium according to claim 12, wherein track pitch of said first signal recording region (43) is shorter than track pitch of said second signal recording region (48).

* * * * *